Sept. 1, 1942.   J. P. OSTRANDER   2,294,850
GROUND GEAR FOR AIRPLANES
Filed July 15, 1940   2 Sheets-Sheet 1
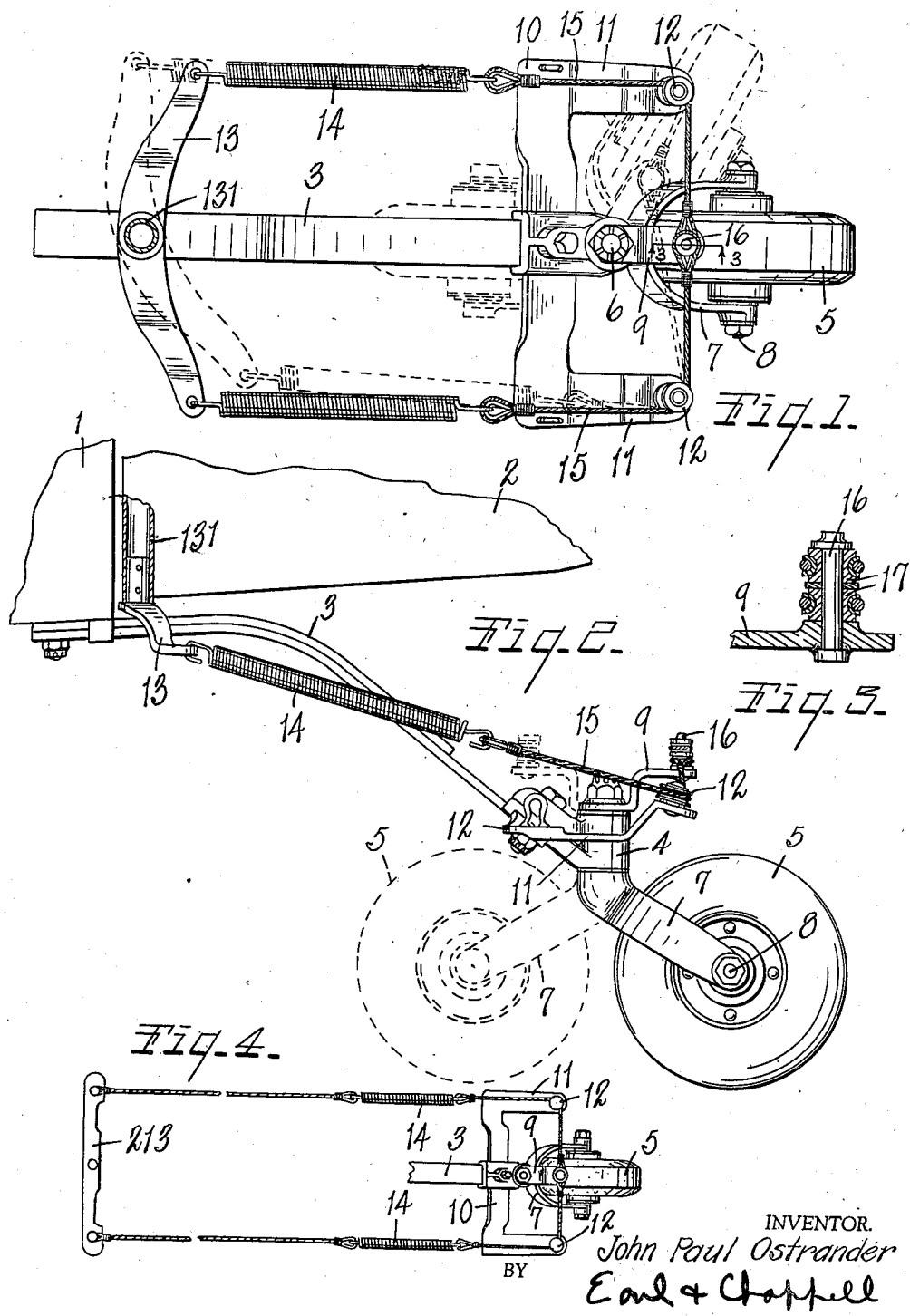
INVENTOR.
John Paul Ostrander
BY Earl & Chappell
ATTORNEYS.

Sept. 1, 1942.   J. P. OSTRANDER   2,294,850
GROUND GEAR FOR AIRPLANES
Filed July 15, 1940   2 Sheets-Sheet 2
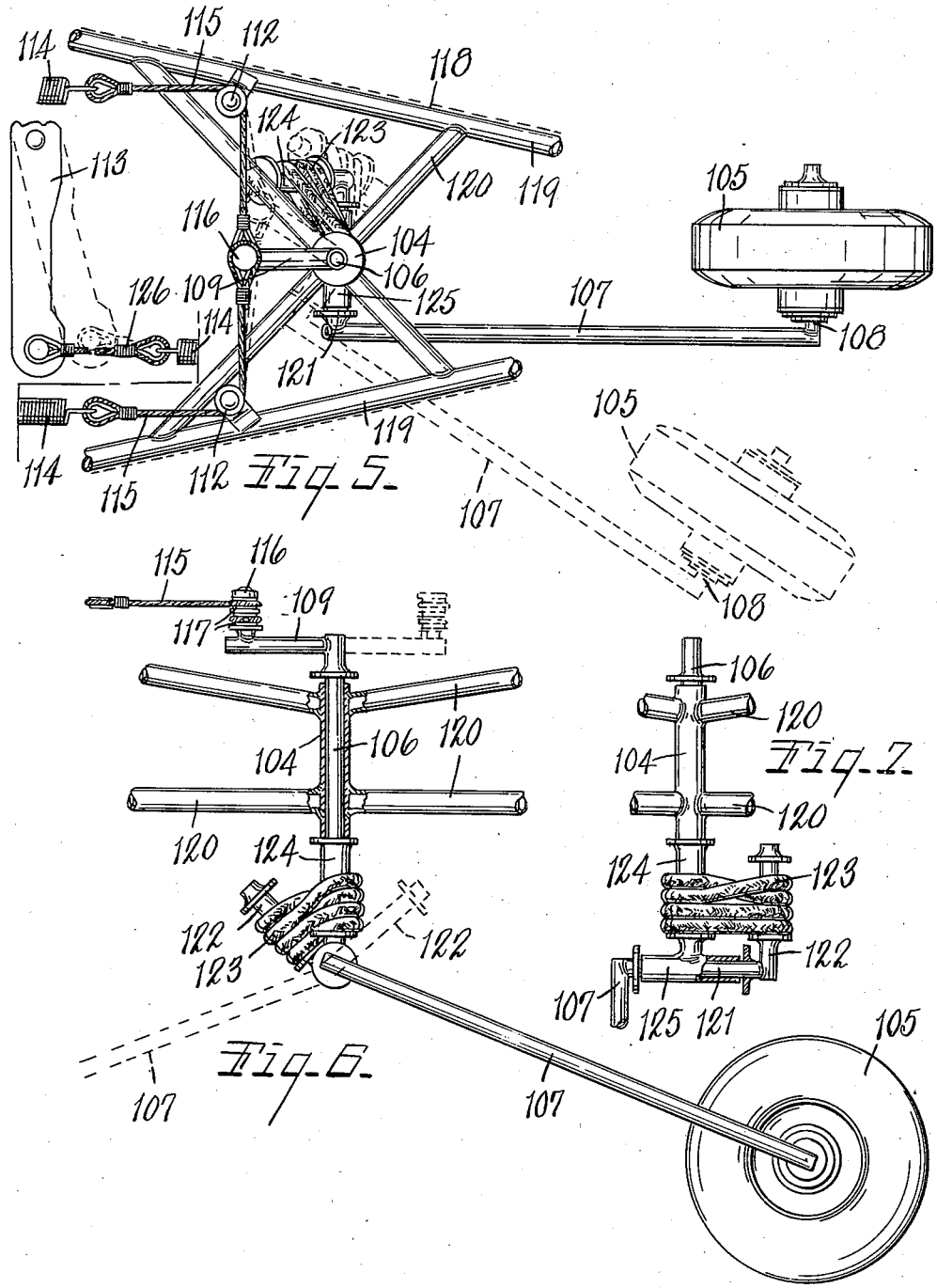
INVENTOR.
John Paul Ostrander
BY Earl & Chappell
ATTORNEYS.

Patented Sept. 1, 1942

2,294,850

UNITED STATES PATENT OFFICE 2,294,850

GROUND GEAR FOR AIRPLANES

John Paul Ostrander, Benton Harbor, Mich.

Application July 15, 1940, Serial No. 345,543

14 Claims. (Cl. 244—109)

This invention relates to ground gear for airplanes and primarily to caster wheels which are ordinarily employed as tail wheels. These tail wheels are provided to assist in steering the airplane when it is on the ground and may be connected to the steering control means of the airplane or to the rudder of the airplane by suitable connections, so that when it is desired to steer the plane on the ground the wheel may be moved, or if the rudder is moved, as is common in practice in steering the airplane on the ground, the wheel is also turned.

Heretofore airplanes equipped with steerable caster wheels either at the tail or elsewhere have been employed without difficulty when the plane was moving forwardly over the ground, but it has been difficult to back the plane as is necessary at times because the steerable wheels would not caster.

The present invention has for its objects:

First, to provide a new and improved ground gear for airplanes.

Second, to provide such a ground gear including a steerable wheel without the disadvantages heretofore existing in such structures as above set forth.

Third, to provide such a wheel which is steerable and which will caster when the airplane is backed up on the ground.

Fourth, to provide such a construction which may be installed on existing airplanes or which may be built into new airplanes, and which may either be enclosed in the fuselage or mounted outside, or may be connected to the steering control means of the plane, or may be connected to the rudder thereof.

Fifth, to provide such a construction which is simple and effective and which may be made very inexpensively.

Other objects pertaining to details and economies of construction and operation will appear from the detailed description to follow. The invention is defined in the claims. A structure showing the preferred forms of the invention is illustrated in the accompanying drawings, in which:

Fig. 1 is a top plan view of one form of my invention.

Fig. 2 is a side elevational view of the form of the invention shown in Fig. 1.

Fig. 3 is a detail sectional view taken on line 3—3 of Fig. 1.

Fig. 4 is a view showing a modified form of the invention shown in Figs. 1, 2 and 3.

Fig. 5 is a top plan view of a different form of the invention.

Fig. 6 is a side elevational view of the structure shown in Fig. 5, partly in section.

Fig. 7 is a detail view of a portion of the construction taken from the right hand side of Fig. 6.

My invention may be applied to any suitable airplane which has a fuselage 1 and a rudder 2. In the form of the invention shown in Figs. 1, 2 and 3, attached to the tail of the airplane is a cantilever spring 3 which carries a bearing block 4 in which a caster wheel 5 having a substantially vertical post 6 journaled in the bearing block 4 is attached to a suitable fork 7 in which the wheel is mounted on an axle 8.

Fixed to the post 6 for rotation thereof and consequent steering of the wheel 5 is a crank arm 9. This arm is fastened at the upper end of the post 6 and when the wheel is in a rearwardly extended position, as shown in full line in Figs. 1 and 2, the crank arm 9 extends from the post 6 longitudinally of the airplane. Mounted on the cantilever spring 3 is a cross member 10 with rearwardly extending arms 11, on each of which is mounted a pulley 12. These pulleys are spaced either side of the post 6 laterally of the airplane.

In order to steer the wheel 5 I may provide a suitable cross member 13 which is fastened to the torque tube 131 of the rudder 2, so that when the rudder is turned the cross member 13 will turn. The turning of the rudder in this construction will be accomplished by the usual steering wheel control means. Extending from the ends of the cross member 13 are longitudinally extensible control elements consisting of springs 14 and cables 15 which pass through or around the guides or pulleys 12. The ends of these extensible control elements are fastened pivotally by means of a pin 16 and bushing 17 to the free end of the crank arm 9 at a point spaced from the post 6.

It will be apparent that when the rudder is moved the cross member 13 will also be moved to a position such as that shown in dotted lines in Fig. 1. This will tend to swing the crank arm 9 to the dotted line position shown in Fig. 1, turning the wheel. When it is desired to back up on the ground, a backward movement of the plane will cause the wheel 5 to caster to the position shown in dotted lines in Fig. 2. The extensible elements will stretch due to elongation of the spring 14 to permit the crank arm 9 to swing to the dotted line position shown in Fig. 2. The pivotal connection 16 and 17 between the cables 15 and the crank arm 9 is above the end of the post 6 so that there is no interference and the crank can swing to the position easily. When it is desired to pull the plane ahead the wheel will caster to the full line position shown in Figs. 1 and 2 and will be fully steerable when in this position.

In Fig. 4 I show a modified form of the invention shown in Figs. 1, 2 and 3. Instead of connecting to the cross member 13 with the extensible elements, I connect to a rudder bar 213. This rudder bar may be an independent control means for the steering of the caster wheel or it may be the conventional rudder bar of the airplane.

In Figs. 5, 6 and 7 I show a different form of the invention. Instead of applying my invention outside the fuselage of the plane, as shown in Figs. 1 to 4, I provide a bearing block 104 suitably mounted in the fuselage of the airplane, which is indicated at 118. The cover for the frame 119 is indicated in dotted lines, since it forms no part of my invention.

Cross braces 120 are employed to firmly hold the bearing block 104. The caster wheel 105 is mounted on an axle 108 which extends laterally from a connecting arm 107 which is connected to the vertical post 106 by means of the pivoted member 121 having an extending crank arm 122 which extends parallel with the post 106. Shock cord 123 is wrapped about the crank arm 122 and the lower portion 124 of the bearing block 104 to provide resiliency in the tail wheel 105. A bearing 125 is provided for the pivot 121.

At the upper end of the post 106 I provide a crank arm 100 to which the cables 115 are pivotally connected by means of a construction similar to that shown in Fig. 3. The arm 109 when the wheel is in the rear position shown in Fig. 5, extends longitudinally of the airplane. Both the bearing block 104 and guides or pulleys 112 are mounted in the fuselage. These guides or pulleys 112 are spaced laterally of the airplane on opposite sides of the post 106, and the cables 115 pass through or around said guides or pulleys 112.

The rest of the connecting elements consist of springs 114 and additional cord 126 which extend to the rudder bar 113 of the airplane. It will be obvious that when the rudder bar is moved as indicated in dotted lines the wheel 105 will be steered. It will also be obvious that when the plane is backed up on the ground the wheel will caster so that the connecting arm 107 will assume the dotted line position shown in Fig. 6. The connecting means 116 and 117 on the crank arm 109, which correspond to connecting means 16 and 17 of Fig. 3, are positioned above the end of the post 106 so that there is complete clearance, permitting the crank arm 109 to turn completely around without difficulty.

It will be apparent that my invention can either be built into a plane or can be applied to existing planes without difficulty. The construction is inexpensive, and will not interfere in backing up the plane as is the case with prior art steerable tail wheels or caster wheel construction. The caster wheel of my construction will ordinarily be applied to the tail of the plane, although in certain planes of recent design the caster wheel is positioned in the front. The wheel in either instance serves as a support for those portions of the plane which are not supported by the standard landing wheels, and the wheels will support the airplane in a three point landing attitude.

The terms and expressions which have been herein employed are used as terms of description and not of limitation. There is no intention in the use of such terms and expressions of excluding any equivalents of the features shown and described or portions thereof. It is recognized that various modifications are possible within the scope of the invention claimed.

Having thus described my invention, what I claim as new and desire to secure by Letters Patent is:

1. In an airplane, ground gear comprising a bearing block, a caster wheel having a substantially vertical pivot post journalled in said bearing block, a crank arm fixed to said post to turn the same to steer said caster wheel and extending longitudinally of said airplane, a pair of guides spaced laterally in said airplane and on opposite sides of said post, steering control means, a pair of longitudinally extensible connecting means connected to and extending from said steering control means, one through each guide, and pivotal means on said crank arm connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

2. In an airplane, ground gear comprising a bearing block, a caster wheel having a substantially vertical pivot post journalled in said bearing block, a crank arm fixed to and extending from said post to turn the same to steer said castor wheel, a pair of guides on opposite sides of said post, steering control means, a pair of longitudinally extensible connecting means connected to and extending from said steering control means, one through each guide, and pivotal means on said crank arm connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

3. In an airplane, ground gear comprising a bearing block, a caster wheel having a substantially vertical pivot post journalled in said bearing block, a crank arm fixed to and extending from said post to turn the same to steer said caster wheel, steering control means, a pair of longitudinally extensible connecting means connected to and extending from said steering control means, and pivotal means on said crank arm connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

4. In an airplane, ground gear comprising a bearing block, a caster wheel having a substantially vertical pivot post journalled in said bearing block, a crank arm fixed to and extending from said post to turn the same to steer said caster wheel, a pair of guides on opposite sides of said post, steering control means, a pair of connecting means connected to and extending from said steering control means, one through each guide, and pivotal means on said crank arm connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

5. In an airplane, ground gear comprising a bearing block, a caster wheel having a substantially vertical pivot post journalled in said bearing block, a crank arm fixed to and extending from said post to turn the same to steer said caster wheel, steering control means, a pair of connecting means connected to and extending from said steering control means, and pivotal means on said crank arm connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

6. In an airplane having a fuselage, a bearing block mounted in said fuselage, a caster wheel having a vertical post journalled in said bearing block, a crank arm fixed to said post to turn the same to steer said caster wheel and extending longitudinally of said airplane, a pair of guides on opposite sides of said post and spaced laterally in said fuselage, a steering control means, a pair of longitudinally extensible connecting means connected to and extending from said steering control means, one through each guide, and pivotal means on said crank arm extending above the upper end of said post and connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

7. In an airplane having a fuselage, a bearing block mounted in said fuselage, a caster wheel having a vertical post journalled in said bearing block, a crank arm fixed to said post to turn the same to steer said caster wheel, a pair of guides on opposite sides of said post and in said fuselage, a steering control means, a pair of longitudinally extensible connecting means connected to and extending from said steering control means, one through each guide, and pivotal means on said crank arm extending above the upper end of said post and connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

8. In an airplane having a fuselage, a bearing block mounted in said fuselage, a caster wheel having a vertical post journalled in said bearing block, a crank arm fixed to said post to turn the same to steer said caster wheel, a steering control means, a pair of longitudinally extensible connecting means connected to and extending from said steering control means, and pivotal means on said crank arm extending above the upper end of said post and connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

9. In an airplane having a fuselage, a bearing block mounted in said fuselage, a caster wheel having a vertical post journalled in said bearing block, a crank arm fixed to said post to turn the same to steer said caster wheel, a pair of guides on opposite sides of said post and in said fuselage, a steering control means, a pair of connecting means connected to and extending from said steering control means, one through each guide, and pivotal means on said crank arm extending above the upper end of said post and connecting said connecting means to said crank arm at a point spaced from said post and above the upper end of said post whereby on bacward movement of the airplane on the ground said caster wheel may caster and may turn through 360°, and said connecting means may clear the end of said post by movement in a plane above the end of said post and extending transversely of the axis of said post.

10. In an airplane having a fuselage, a bearing block mounted in said fuselage, a caster wheel having a vertical post journalled in said bearing block, a crank arm fixed to said post to turn the same to steer said caster wheel, a steering control means, a pair of connecting means connected to and extending from said steering control means, and pivotal means on said crank arm extending above the upper end of said post and connecting said connecting means to said crank arm at a point spaced from said post and above the upper end of said post whereby on backward movement of the airplane on the ground said caster wheel may caster and may turn through 360°, and said connecting means may clear the end of said post by movement in a plane above the end of said post and extending transversely of the axis of said post.

11. In an airplane, ground gear comprising a caster wheel, steering control means, and resilient means connecting said steering control means to said caster wheel for steering the same and means connecting said caster wheel to said connecting means movable through an arc of 360° in an unobstructed plane to permit said wheel to caster when said airplane is moved backwardly on the ground without interference with said connecting means connecting the steering control to the caster wheel.

12. In an airplane, ground gear comprising a castor wheel, steering control means, and means connecting said steering control means to said caster wheel for steering the same and means connecting said caster wheel to said connecting means movable through an arc of 360° in an unobstructed plane to permit said wheel to caster when said airplane is moved backwardly on the ground.

13. In an airplane, a ground gear comprising a bearing block, a caster wheel, a steering post, a crank arm fixed to said post to turn the same to steer said caster wheel, a pair of longitudinally extensible connecting means, steering means connected to said connecting means, pivotal means on said crank arm connecting said connecting means to said crank arm, said pivotal means being mounted on said crank arm at a point spaced from said steering post and beyond the end of said post whereby on 360° movement of said crank said connecting means may clear the end of said steering post by movement in a plane beyond the end of said steering post and transverse to the axis thereof.

14. In an airplane, a ground gear comprising a bearing block, a caster wheel, a steering post, a crank arm fixed to said post to turn the same to steer said caster wheel, a pair of longitudinally extensible connecting means, steering means connected to said connecting means, pivotal means on said crank arm connecting said connecting means to said crank arm, said pivotal means being mounted on said crank arm and movable about said steering post in a plane substantially transverse to the axis of said steering post, said plane being clear of obstruction in the circle described by said pivotal means, whereby said connecting means may clear said steering post and said crank arm may be turned through 360° upon castering of said caster wheel.

JOHN PAUL OSTRANDER.